United States Patent
Liang et al.

(10) Patent No.: US 11,507,854 B2
(45) Date of Patent: Nov. 22, 2022

(54) METHOD AND APPARATUS FOR RECOGNIZING INTENTION, AND NON-TRANSITORY COMPUTER-READABLE RECORDING MEDIUM

(71) Applicants: Liang Liang, Beijing (CN); Lei Ding, Beijing (CN); Bin Dong, Beijing (CN); Shanshan Jiang, Beijing (CN); Yixuan Tong, Beijing (CN)

(72) Inventors: Liang Liang, Beijing (CN); Lei Ding, Beijing (CN); Bin Dong, Beijing (CN); Shanshan Jiang, Beijing (CN); Yixuan Tong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 427 days.

(21) Appl. No.: 16/739,311

(22) Filed: Jan. 10, 2020

(65) Prior Publication Data
US 2020/0242486 A1 Jul. 30, 2020

(30) Foreign Application Priority Data

Jan. 29, 2019 (CN) .......................... 201910087304.9

(51) Int. Cl.
*G06N 5/02* (2006.01)
*G06K 9/62* (2022.01)
(Continued)

(52) U.S. Cl.
CPC ....... *G06N 5/022* (2013.01); *G06F 16/90332* (2019.01); *G06K 9/6269* (2013.01); *G06N 5/025* (2013.01); *G06N 20/10* (2019.01)

(58) Field of Classification Search
CPC ........ G06N 5/022; G06N 5/025; G06N 20/10; G06N 3/08; G06F 16/90332; G06K 9/6269; G06K 9/6228; G06V 30/40
See application file for complete search history.

(56) References Cited

U.S. PATENT DOCUMENTS 10,282,420 B2   5/2019  Jiang et al.
10,726,062 B2 * 7/2020  Zheng .................. G06V 10/255
(Continued)

FOREIGN PATENT DOCUMENTS

CN     107748757         3/2018
CN     107943860 A  *    4/2018    ............. G06F 16/35
(Continued)

OTHER PUBLICATIONS

Xun, G., Jia, X., Gopalakrishnan, V., & Zhang, A. (2016). A survey on context learning. IEEE Transactions on Knowledge and Data Engineering, 29(1), 38-56. (Year: 2016).*
(Continued)

*Primary Examiner* — Hal Schnee
(74) *Attorney, Agent, or Firm* — IPUSA, PLLC

(57) ABSTRACT

A method and an apparatus for recognizing an intention, and a non-transitory computer-readable recording medium are provided. The method includes learning vectors of knowledge base elements in corpus samples, and converting the corpus samples into row vectors composed of the vectors of the knowledge base elements in a knowledge base; extracting feature vectors from respective pooling windows in the corpus samples by hierarchical pooling, determining weights positively correlated with similarities between texts within the respective pooling windows and the respective corpus samples, performing weighting on the extracted feature vectors to obtain feature vectors of the respective pooling windows, and obtaining feature vectors of the respective corpus samples composed of the feature vectors of the pooling windows; training a vector-based intention recognition classifier, based on the feature vectors of the corpus samples; and recognizing an intention in querying a corpus, using the trained intention recognition classifier.

17 Claims, 8 Drawing Sheets

(51) Int. Cl.
*G06F 16/9032* (2019.01)
*G06N 20/10* (2019.01)

(56) References Cited

U.S. PATENT DOCUMENTS

2017/0286401 A1* 10/2017 He ..................... G06F 16/3344
2018/0047036 A1   2/2018 Zhang et al.
2018/0268023 A1*  9/2018 Korpusik ............... G06N 5/022
2018/0341863 A1  11/2018 Ding et al.
2019/0251164 A1   8/2019 Ding et al.
2020/0218744 A1*  7/2020 Wang ..................... G16H 10/60

FOREIGN PATENT DOCUMENTS

CN      108920622 A  * 11/2018  ............. G06F 40/30
JP     2017059205 A  *  3/2017  ............. G06F 40/30

OTHER PUBLICATIONS

Figueroa, A., & Atkinson, J. (2015). Ensembling classifiers for detecting user intentions behind web queries. IEEE Internet Computing, 20(2), 8-16. (Year: 2015).*

Ma, Y., & Cambria, E. (2018). Concept-Based Embeddings for Natural Language Processing. arXiv preprint arXiv:1807.05519. (Year: 2018).*

Qiu, L., Chen, Y., Jia, H., & Zhang, Z. (2018). Query intent recognition based on multi-class features. IEEE Access, 6, 52195-52204. (Year: 2018).*

Shen, Wei, et al. "Bag of shape features with a learned pooling function for shape recognition." Pattern Recognition Letters 106 (2018): 33-40. (Year: 2018).*

* cited by examiner

METHOD AND APPARATUS FOR RECOGNIZING INTENTION, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 201910087304.9 filed on Jan. 29, 2019, the entire contents of which are incorporated herein by reference.

BACKGROUND OF THE INVENTION

1. Field of the Invention

The present invention relates to the field of natural language processing, and specifically, a method and an apparatus for recognizing an intention, and a non-transitory computer-readable recording medium.

2. Description of the Related Art

With increase in scale of the Internet, intelligently providing network service to users has become a hot trend. Under such a trend, by accurately recognizing an intention of a user, it is possible to accurately grasp needs of the user, so as provide a personalized service to the user, improve a user experience and improve the market competitiveness of a product. Thus, it is important to recognize an operation intention of a user.

Conventional intention recognition methods mainly relate to navigation, information, and transaction. The method relating to navigation refers to a method for finding a homepage of a website. The method relating to information refers to a method for finding a webpage with some contents, such as a news webpage, an encyclopedia webpage or the like. A user can get satisfactory information by reading such a webpage. The method relating to transaction refers to a method for finding a webpage to complete a certain transaction, such as bank transfer, purchase of goods, inquiry of airline tickets or the like.

However, with development of information collection technology, a method for simply classifying an intention can no longer meet requirements of intention recognition for providing service to users. The information input a user is often short but the content of expression is complex, however it is difficult to recognize an intention what the user really wants to express by a conventional intention recognition method. Thus, it is desired to provide a more intelligent intention recognition method to recognize complex information of a user.

The Chinese Unexamined Patent Application Publication CN107748757A discloses a question-answer method based on a knowledge map. In such a method, a user intention is recognized by a matching technology based on knowledge base entities and relationships, and scores are obtained based on the entity recognition matching degrees and relationship recognition matching degrees in a question-answer process. A large amount of tagged data is required in model training and a multiple semantic matching technology is used, thus time complexity of the method is large.

In conventional mainstream intention recognition methods, recognition accuracy of a model is low. Currently, there is no effective solution to solve the problem of low recognition accuracy in conventional methods for recognizing an intention of a user.

SUMMARY OF THE INVENTION

According to an aspect of the present invention, a method for recognizing an intention is provided. The method includes learning vectors of one or more knowledge base elements in corpus samples, and converting the corpus samples into row vectors composed of the vectors of the knowledge base elements, the knowledge base elements being elements in a predetermined knowledge base; extracting feature vectors from respective pooling windows in the corpus samples by hierarchical pooling, determining weights positively correlated with similarities between texts within the respective pooling windows and the respective corpus samples, performing weighting on the extracted feature vectors to obtain feature vectors of the respective pooling windows, and obtaining feature vectors of the respective corpus samples composed of the feature vectors of the pooling windows; training a vector-based intention recognition classifier, based on the feature vectors of the corpus samples; and recognizing an intention in querying a corpus, using the trained intention recognition classifier.

According to another aspect of the present invention, an apparatus for recognizing an intention is provided. The apparatus includes a memory storing computer-executable instructions; and one or more processors. The one or more processors are configured to execute the computer-executable instructions such that the one or more processors are configured to learn vectors of one or more knowledge base elements in corpus samples, and convert the corpus samples into row vectors composed of the vectors of the knowledge base elements, the knowledge base elements being elements in a predetermined knowledge base; extract feature vectors from respective pooling windows in the corpus samples by hierarchical pooling, determine weights positively correlated with similarities between texts within the respective pooling windows and the respective corpus samples, perform weighting on the extracted feature vectors to obtain feature vectors of the respective pooling windows, and obtain feature vectors of the respective corpus samples composed of the feature vectors of the pooling windows; train a vector-based intention recognition classifier, based on the feature vectors of the corpus samples; and recognize an intention in querying a corpus, using the trained intention recognition classifier.

According to another aspect of the present invention, a non-transitory computer-readable recording medium having computer-executable instructions for execution by one or more processors is provided. The computer-executable instructions, when executed, cause the one or more processors to carry out a method for recognizing an intention. The method includes learning vectors of one or more knowledge base elements in corpus samples, and converting the corpus samples into row vectors composed of the vectors of the knowledge base elements, the knowledge base elements being elements in a predetermined knowledge base; extracting feature vectors from respective pooling windows in the corpus samples by hierarchical pooling, determining weights positively correlated with similarities between texts within the respective pooling windows and the respective corpus samples, performing weighting on the extracted feature vectors to obtain feature vectors of the respective pooling windows, and obtaining feature vectors of the respective corpus samples composed of the feature vectors of the pooling windows; training a vector-based intention recognition classifier, based on the feature vectors of the corpus samples; and recognizing an intention in querying a corpus, using the trained intention recognition classifier.

BRIEF DESCRIPTION OF THE DRAWINGS

The above and other objects, features and advantages of the present invention will be further clarified by describing in detail embodiments of the present invention in combination with the drawings.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in time order, however the performing sequence is not limited to the time order. Any steps may be performed in parallel or independently.

In view of the problem of the conventional technology, embodiments of the present invention have an object to provide a method and an apparatus for recognizing an intention, and a non-transitory computer-readable recording medium, which can reduce dependence of an intention recognition model on tagged data, and can improve the recognition accuracy of the intention recognition model.

Figure 1:
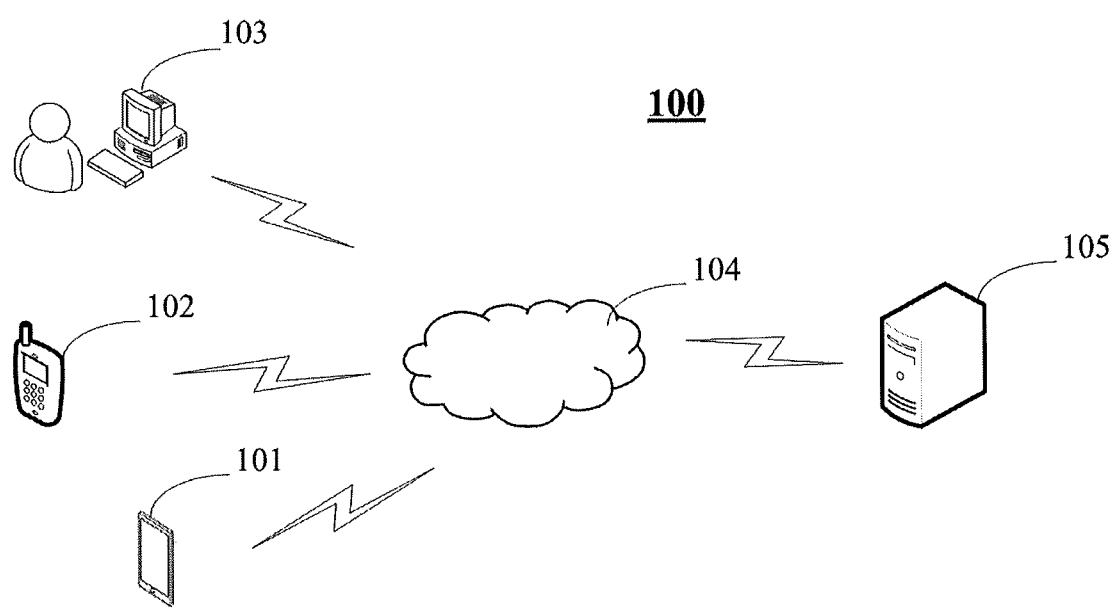
FIG. 1 is a schematic diagram illustrating an application scenario of an intention recognizing method according to an embodiment of the present invention.

The method may be applied to any scenarios relating to intention recognition of natural language, such as a dialogue robot, a search engine or the like. FIG. 1 shows an exemplary system architecture 100 of an intention recognizing method according to an embodiment of the present invention. As shown in FIG. 1, the system architecture 100 may include terminal devices 101, 102 and 103, a network 104, and a server 105. The network 104 is a medium for providing a communication link between the terminal devices 101, 102 and 103, and the server 105. The network 104 may include various connection types, such as wired, wireless communication links, fiber optic cables or the like.

A user may use the terminal device 101, 102 and 103 to interact with the server 105 through the network 104, so as to send information such as a corpus to be queried. Various communication client applications, such as file editing applications, information search applications, information transmission applications and the like, may be installed on the terminal devices 101, 102 and 103. The terminal devices 101, 102 and 103 may be various electronic devices having a display screen and capable of sending information and files, including, but not limited to, smart phones, tablet computers, laptop computers, desktop computers and the like. The server 105 may perform intention recognition processing. Specifically, the server 105 may receive a corpus to be queried from a terminal device, input the corpus to be queried to a pre-trained intention recognition classifier to predict an intention in querying the corpus, and then return the prediction result of the intention to the terminal device.

Note that the intention recognizing method according to the embodiment of the present invention may be executed by the server 105, and accordingly, an intention recognizing apparatus may be provided in the server 105. Alternatively, the intention recognizing method according to the embodiment of the present invention may be executed by a terminal device, and accordingly, the intention recognizing apparatus may be provided in the terminal device.

Note that the numbers of the terminal devices, the network, and the server in FIG. 1 are merely exemplary. Depending on implementation needs, the respective numbers of terminal devices, networks, and servers may be any numbers.

Figure 2:
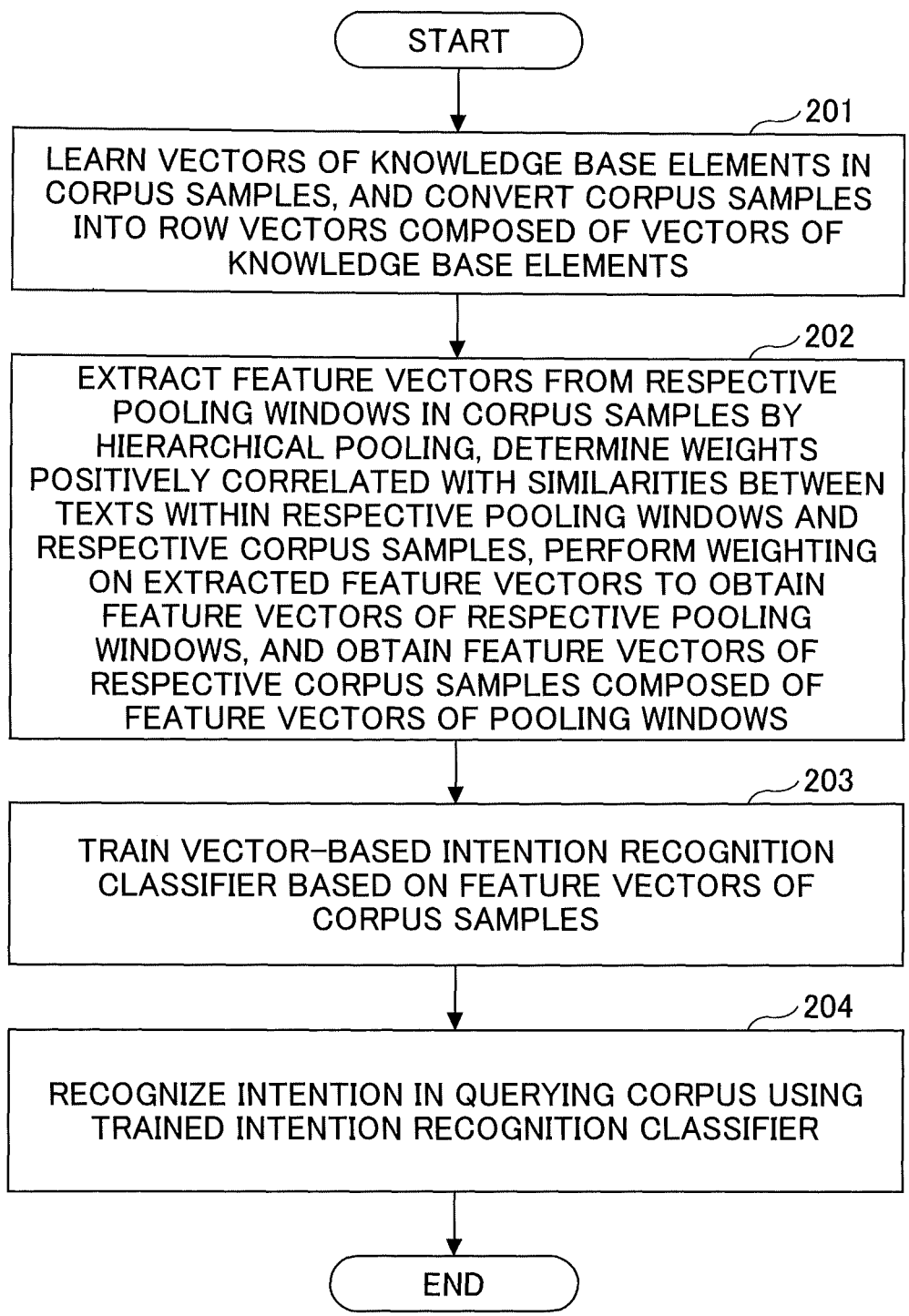
FIG. 2 is a flowchart illustrating the intention recognizing method according to the embodiment of the present invention.

FIG. 2 is a flowchart illustrating the intention recognizing method according to the embodiment of the present invention. The intention recognizing method can improve recognition accuracy of an intention recognition classifier. As shown in FIG. 2, the intention recognizing method may include steps 201 to 204.

In step 201, vectors of one or more knowledge base elements in corpus samples are learned, and the corpus samples are converted into row vectors composed of the vectors of the knowledge base elements. The knowledge base elements are elements in a predetermined knowledge base.

In step 201, in a learning process of the vectors the corpus samples of the embodiment of the present invention, the vector learning is performed based on information such as knowledge base elements. Compared to a method of directly learning original word vectors, it is possible to reduce noise to a certain extent. Specifically, in the method according to the embodiment of the present, the knowledge base elements existing in the corpus samples may be replaced with symbols corresponding to the knowledge base elements. The knowledge base elements may specifically include entities, attributes and relationships in the knowledge base. Then, vectors of the symbols in the corpus samples may be obtained by word vector training, and the corpus samples may be converted into row vectors composed of the vectors of the symbols in the corpus samples. Here, each of the row vectors is a symbol corresponding to one knowledge base element in a corpus sample.

In the method according to the embodiment of the present invention, before performing the above vector learning, string preprocessing may be perform on corpus samples to obtain a preprocessed corpus samples. The preprocessing includes, but is not limited to, data cleaning, stop word removal, error correction, word drying, word segmentation and the like. After the preprocessing, the vector learning in step 201 is performed to obtain corresponding vector representation.

Figure 3:
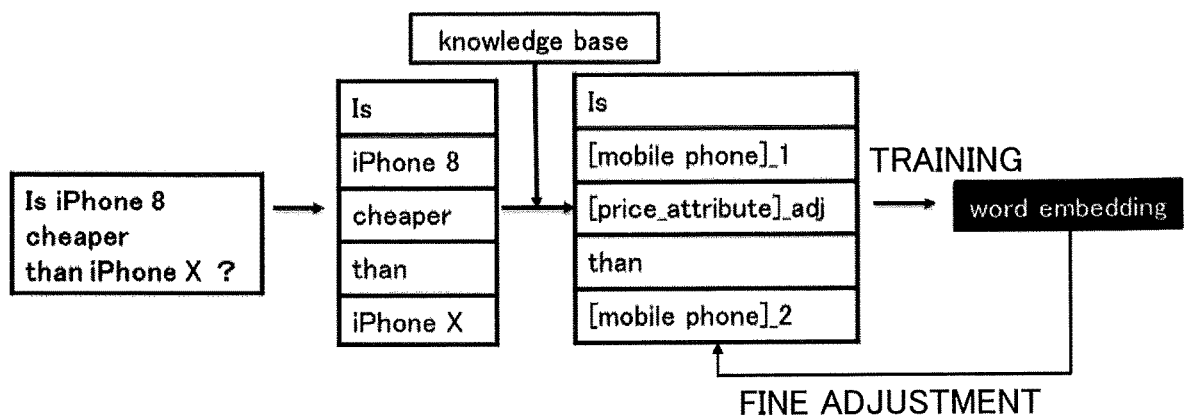
FIG. 3 is a schematic diagram illustrating word vector learning of a corpus sample according to the embodiment of the present invention.

FIG. 3 shows an example of word vector learning of a corpus sample. Here, the corpus sample is "Is iPhone 8 cheaper than iPhone X?". By performing string preprocessing, word segmentation processing and the like on the above corpus sample, the words composing the above corpus sample, namely "Is", "iPhone 8", "cheaper", "than" and "iPhone X" are obtained. Then, the knowledge base elements existing in the above corpus sample are obtained. Assume that the knowledge base is a knowledge base in the field of electronic commerce, which includes various entities relating to mobile phones, such as iPhone 8 and iPhone X, and the price attributes of the entities, such as cheaper and the like. Accordingly, "iPhone 8", "iPhone X" and "cheaper" in the above corpus sample may be replaced with specific symbols corresponding to these words, namely "[mobile phone]_1", "[mobile phone]_2" and "[price attribute]_adj" as shown in FIG. 3. After the above processing of all corpus samples are completed, vectors of symbols are trained by a conventional word vector training method to obtain vector representation corresponding to each specific symbol. The corpus samples may be converted into row vectors, and an element in each row of the row vector is a vector corresponding to a knowledge base element in the above corpus sample.

Here, the specific method of word vector training may be implemented by referring to various existing word vector training algorithms in conventional technologies, and the embodiment of the present invention is not limited to the specific method.

In step 202, feature vectors are extracted from respective pooling windows in the corpus samples by hierarchical pooling, weights positively correlated with similarities between texts within the respective pooling windows and the respective corpus samples are determined, weighting is performed on the extracted feature vectors to obtain feature vectors of the respective pooling windows, and feature vectors of the respective corpus samples composed of the feature vectors of the pooling windows are obtained.

Figure 4:
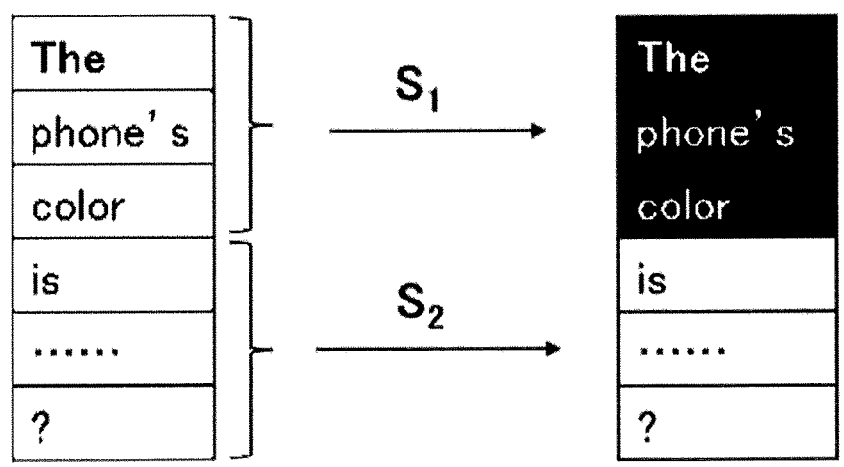
FIG. 4 is a schematic diagram illustrating similarities between texts according to the embodiment of the present invention.

The pooling is performed on each pooling window by hierarchical pooling, thus it is possible to reduce the dimension of the output feature vectors and improve the effect of the pooling. The pooling window usually has a preset size and moves at a preset step size. As shown in FIG. 4, assume that a sentence is "The phone's color is . . . ?", the size of the pooling window is 3 and the step size of the pooling window is 3. There may be two pooling windows, the text within the first pooling window is "The phone's color", and the text within the second pooling window is "is . . . ?". Regarding the similarities between the texts, the similarity $S_1$ between the text within the first pooling window and the sentence is relatively high, and the similarity $S_2$ between the text within the second pooling window and the sentence is relatively low. In the hierarchical pooling of the embodiment of the present invention, the weights based on the similarities between the texts are introduced, and weighting is performed on the feature vectors extracted by the pooling. Thus, it is possible to accurately extract relevant semantic features, improve the subsequent learning and training process of the intention recognition classifier, and improve the performance of the trained intention recognition classifier.

Here, the pooling window may include predetermined rows of vectors, such as n rows of vectors in the row vector corresponding to the corpus sample. Hierarchical pooling may include max pooling and average pooling. In step 202, when extracting the feature vectors from respective pooling windows, the max pooling may be performed on the vectors in the pooling windows to obtain first feature vectors, and the average pooling may be performed on the vectors in the pooling windows to obtain second feature vectors. Then, weighting is performed on the vectors obtained by the hierarchical pooling using the weights, the feature vectors of the respective pooling windows are finally obtained. Then, the feature vectors of the corpus samples are obtained by combining the feature vectors of the pooling windows, thereby completing the feature extraction of the corpus samples.

Specifically, in order to simplify processing, the weights may directly adopt the values of the similarities. Alternatively, in the embodiment of the present invention, the weights may also be a function of the above similarities. For example, the weights may positively correlate with the similarities. Namely, the higher the similarity is, the greater the weight is, and the lower the similarity is, the smaller the weight is. Here, the method for calculating the similarity may be implemented by referring to various existing algorithms for calculating a text similarity in conventional technologies, and the embodiment of the present invention is not limited to the similarity calculating method.

Hierarchical pooling generally includes at least two layers of pooling. The above weighting of the embodiment of the present invention may be performed in one or more of the layers. Preferably, in a case where downsampling is performed on the last layer of the hierarchical pooling by using the max pooling, in the embodiment of the present invention, weighting may be performed only on the vectors obtained by the pooling of the last layer by using the weights (the product of the weight and the vector is calculated) to obtained the weighted vectors.

Figure 5:
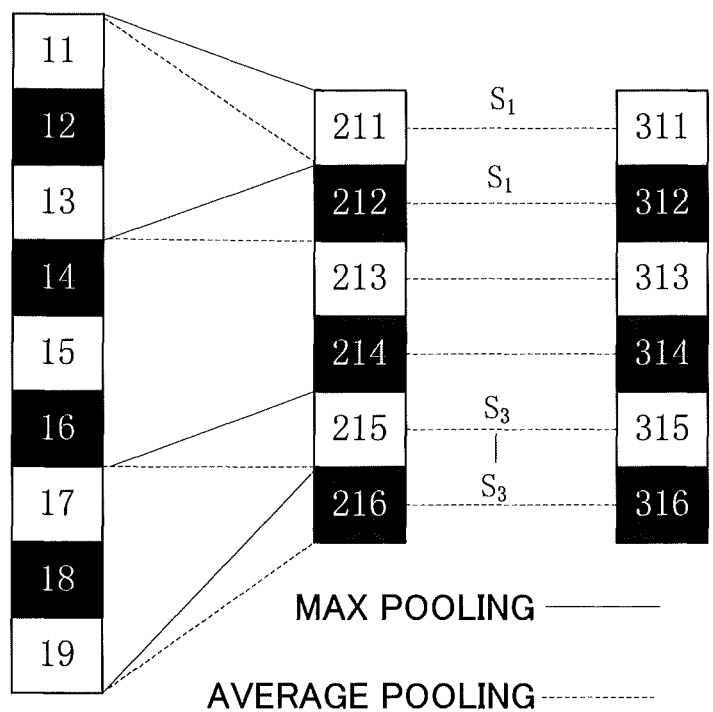
FIG. 5 is a schematic diagram illustrating pooling according to the embodiment of the present invention.

FIG. 5 shows an example of the pooling. As shown in FIG. 5, the pooling window includes 3 rows of vectors, the moving step of the pooling window is 3, a first layer pooling is average pooling and max pooling of the row vector in the corpus sample, and a second layer pooling is max pooling. Number 11 to 19 in FIG. 5 represent vectors of respective rows in the row vector corresponding to the corpus sample. Vectors 211 to 216 are obtained by performing the first layer pooling on the vectors 11 to 19; vectors 311 to 316 are obtained by performing the second layer pooling on the vectors 211 to 216, thereby obtaining the feature vector of the above corpus sample represented by the vectors 311 to 316.

In FIG. 5, in the first layer pooling, the average pooling is performed on the vectors 11 to 13 in the pooling window thereby extracting the feature vector 211 of the pooling window, and the max pooling is performed on the vectors 11 to 13 in the pooling window thereby extracting the feature vector 212 of the pooling window. The average pooling is performed on the vectors 14 to 16 in the pooling window thereby extracting the feature vector 213 of the pooling window, and the max pooling is performed on the vectors 14 to 16 in the pooling window thereby extracting the feature vector 214 of the pooling window. The average pooling is performed on the vectors 17 to 19 in the pooling window thereby extracting the feature vector 215 of the pooling window, and the max pooling is performed on the vectors 16 to 19 in the pooling window thereby extracting the feature vector 216 of the pooling window.

In FIG. 5, in the second layer pooling, the max pooling is performed on the feature vectors 211 to 216 extracted from the respective pooling window, and weighting is performed using the weights of the respective pooling window, thereby obtaining the vectors 311 to 316. For example, if assume that the vector 211 includes elements $a_1, a_2, a_3, \ldots a_n$, where the largest element is $a_i$, then the largest element $a_i$ may be extracted by the max pooling, and the weighting may be performed on the largest element $a_i$ using the weight $S_j$ of the pooling window, namely, $S_i*a_i$ may be calculated.

In step 203, a vector-based intention recognition classifier is trained, based on the feature vectors of the corpus samples.

Here, in the embodiment of the present, a classifier based on vector input may be deployed. The classifier includes, but is not limited to, a support vector machine (SVM) classifier, a multilayer perceptron (MLP) and the like. Then, the intention recognition classifier is trained, based on the feature vectors of the corpus samples obtained in step 202. The specific training method may refer to the existing technology, and detailed descriptions are omitted here. When a predetermined training termination condition is satisfied, the training may be terminated to obtain the trained intention recognition classifier. The training termination condition may be a condition that the number of training times reaches a predetermined number of times, a condition that a training time reaches a predetermined time, or a condition that a convergence degree of an intention recognition model reaches a predetermined requirement.

In step 204, an intention in querying a corpus is recognized using the trained intention recognition classifier.

In the embodiment of the present invention, after obtaining the intention recognition classifier in step 203, intention recognition may be performed on a received corpus to be queried by an intention recognition model (intention recognition classifier), the intention of the corpus to be queried may be predicted, and a prediction result may be output.

From above, according to the intention recognizing method of the embodiment of the present invention, the pooling is performed on the corpus samples based on the similarities between the texts within the respective pooling windows and the respective corpus samples. Thus, it is possible to accurately extract relevant semantic features, improve the learning and training process of the intention recognition classifier, and improve the performance of the trained intention recognition classifier. Furthermore, in the learning process of the vectors the corpus samples of the embodiment of the present invention, the vector learning is performed based on information such as knowledge base elements. Thus, compared to a method of directly learning original word vectors, it is possible to reduce noise to a certain extent, thereby performing the intention recognition more efficiently and accurately.

In conventional intention recognition methods, training of classifiers depend on a large amount of tagged data. When the tagged data is not enough, it is difficult to achieve high performance. In the embodiment of the present invention, a semi-supervised classifier training process may be implemented. The corpus samples include tagged corpus samples whose intention is tagged, and untagged corpus samples whose intention is not tagged. The untagged corpus samples are selected based on the matching degrees between the untagged corpus samples and the information of the knowledge base to expand the tagged corpus samples. Thus, it is possible to remove false positive samples in a sample selection process and reduce dependence of classifier training on tagged data, thereby improving the performance of the intention recognition classifier.

Figure 6:
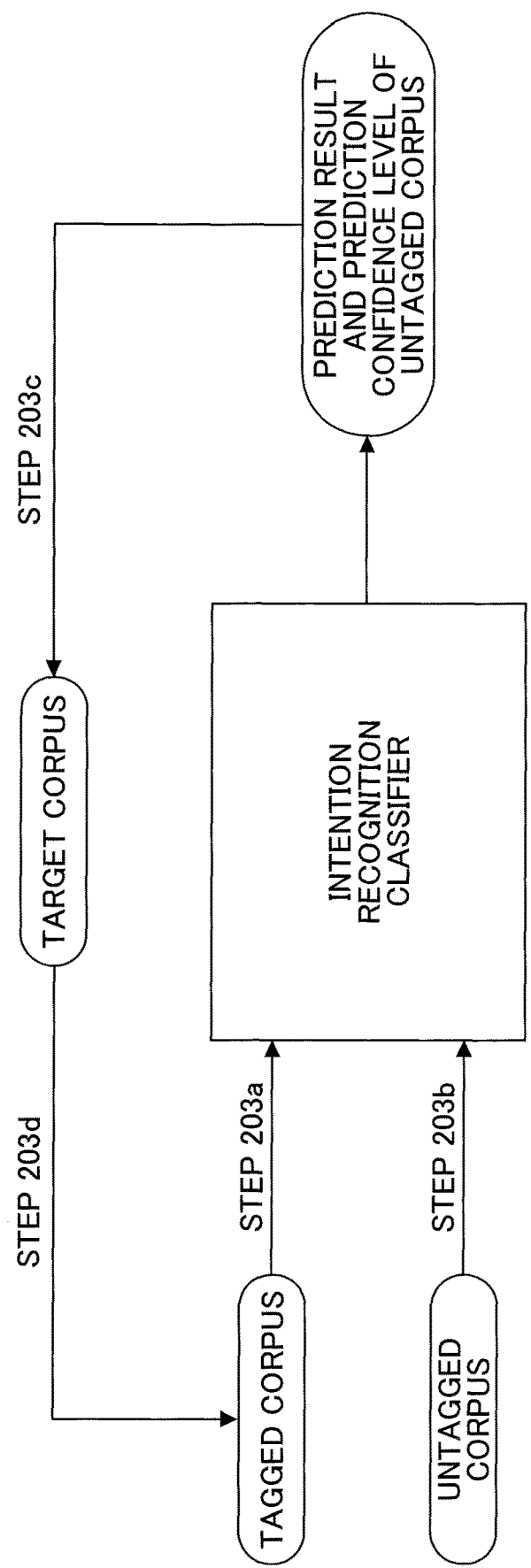
FIG. 6 is a schematic diagram illustrating training of an intention recognition classifier according to the embodiment of the present invention.

As shown in FIG. 6, the training of the intention recognition classifier in step 203 may include the following steps.

In step 203a, the intention recognition classifier is trained using the feature vectors of the tagged corpus samples, it is determined whether a predetermined training termination condition is satisfied after the training is completed, and the training is terminated when the training termination condition is satisfied. Otherwise, processing proceeds to step 203b.

Here, a training process is performed based on the current tagged corpus samples. Specifically, all of the tagged corpus samples may be inputted to the intention recognition classifier, the intention recognition classifier is trained using the tagged data of the tagged corpus samples, it is determined whether the training termination condition is satisfied after the current training is completed. Then, the trained intention recognition classifier may be output when the training termination condition is satisfied; otherwise, processing proceeds to subsequent step 203b to update the sample data of the tagged corpus samples. The training termination condition may be a condition that the number of training times reaches a predetermined number of times, a condition that a training time reaches a predetermined time, or a condition that a convergence degree of an intention recognition model reaches a predetermined requirement.

In step 203b, the intentions of the respective untagged corpus samples are predicted using the trained intention recognition classifier, and prediction confidence levels of the respective untagged corpus samples are obtained.

In step 203b, the intentions of the respective untagged corpus samples are predicted using the intention recognition classifier obtained by the training of step 203a, and prediction results of the intentions and the respective prediction confidence levels are obtained. Here, the untagged corpus samples whose prediction result meets a predetermined condition may be added to a candidate set. Specifically, the predetermined condition may be a condition that the prediction confidence level of the prediction result of the intention recognition classifier is higher than a predetermined threshold.

In step 203c, one or more target corpus samples are selected from the untagged corpus samples based on the prediction confidence levels of the respective untagged corpus samples, and matching degrees between the respective untagged corpus samples and the respective knowledge base elements, and the target corpus samples are tagged based on the predicted intentions and the prediction confidence levels.

Here, one or more first corpus samples whose prediction confidence level is greater than a predetermined threshold may be selected from the untagged corpus samples, and the target corpus samples may be selected from the first corpus samples in a descending order of the numbers of the knowledge base elements included in the respective untagged corpus samples. Namely, in the embodiment of the present invention, the untagged corpus sample including more knowledge base elements is preferably selected as the target corpus sample. For example, the untagged corpus samples whose number of knowledge base elements is greater than a number threshold may be selected as the target corpus samples. Alternatively, in a case where a desired number of the untagged corpus samples are added to the tagged corpus samples, the desired number of the untagged corpus samples may be selected from the first corpus samples as the target corpus samples in a descending order of the numbers of the knowledge base elements included in the respective untagged corpus samples.

In step 203d, the target corpus samples are deleted from the untagged corpus samples, and the target corpus samples are added to the tagged corpus samples, thereby implementing a supplementary update of the tagged corpus samples. Then, processing returns to step 203a to continue next training.

Figure 7:
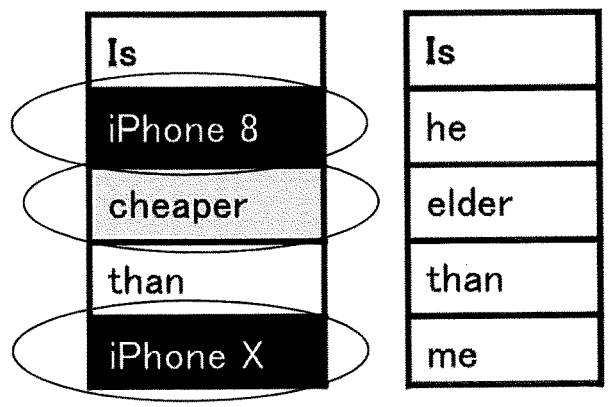
FIG. 7 is a schematic diagram illustrating matching degrees between untagged corpus samples and a knowledge base according to an embodiment of the present invention.

FIG. 7 shows an example of selecting of a target corpus sample. There are two untagged corpus samples, namely, a corpus sample "Is iPhone 8 cheaper than iPhone X" on the left and a corpus sample "Is he elder than me" on the right. The two untagged corpus samples are very similar in semantics and grammatical structure. However, the left corpus sample can match with a preset mobile phone knowledge base to obtain two entities ("iPhone 8" and "iPhone X") and attribute information ("cheaper"), while no match exits in the right corpus sample. Accordingly, in the processing method in step 203c, the left corpus sample is preferably selected as the target corpus sample. Thus, it is possible to remove false positive samples by filtering and optimize the tagged samples, thereby improving the subsequent training of the intention recognition classifier and improving the performance of the trained intention recognition classifier.

According to the intention recognizing method of the embodiment of the present invention, the pooling is performed on the corpus samples based on the similarities between the texts within the respective pooling windows and the respective corpus samples. Thus, compared with the conventional technology, it is possible to accurately extract relevant semantic features, improve the learning and training process of the intention recognition classifier, and improve the performance of the trained intention recognition classifier. Furthermore, in the learning process of the vectors the corpus samples of the embodiment of the present invention, the vector learning is performed based on information such as knowledge base elements. Thus, compared to a method of directly learning original word vectors, it is possible to reduce noise to a certain extent, thereby performing the intention recognition more efficiently and accurately. Additionally, according to the embodiment of the present invention, untagged corpus samples are selected based on the matching degrees between the untagged corpus samples and the information of the knowledge base to expand tagged corpus samples. Thus, it is possible to remove false positive samples in a sample selection process, thereby improving the performance of the intention recognition classifier.

Figure 8:
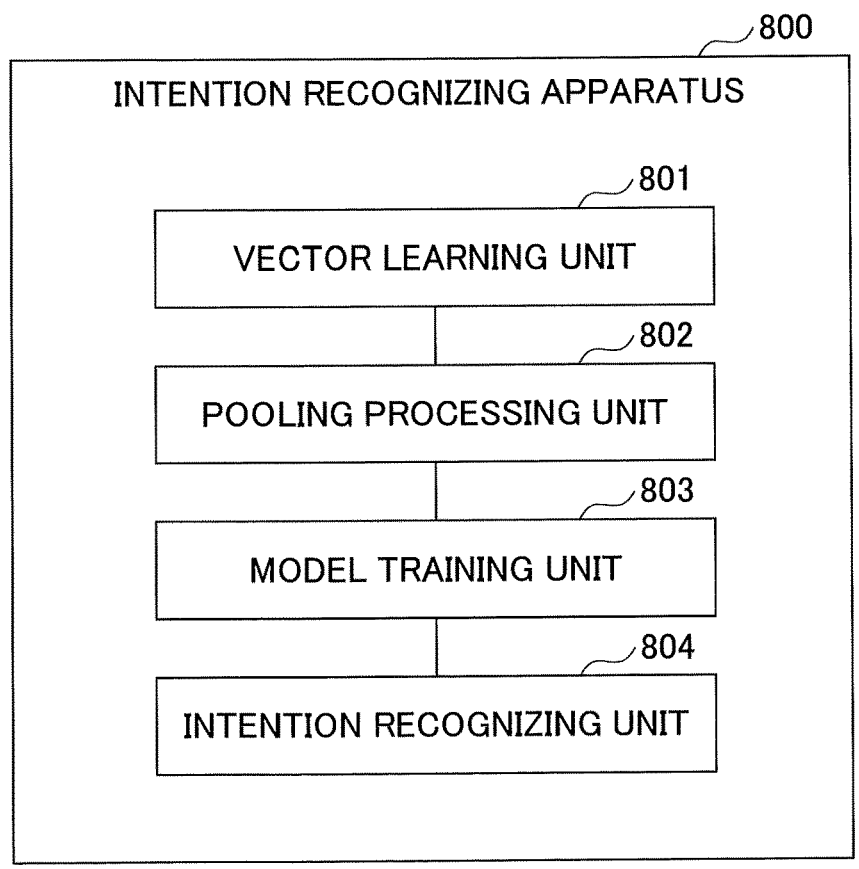
FIG. 8 is a block diagram illustrating a configuration of an intention recognizing apparatus according to an embodiment of the present invention.

An embodiment of the present further provides an intention recognizing apparatus for implementing the above intention recognizing method. As shown in FIG. 8, the intention recognizing apparatus 800 of the embodiment of the present invention includes a vector learning unit 801, a pooling processing unit 802, a model training unit 803 and an intention recognizing unit 804.

The vector learning unit 801 learning vectors of one or more knowledge base elements in corpus samples, and converts the corpus samples into row vectors composed of the vectors of the knowledge base elements, the knowledge base elements being elements in a predetermined knowledge base.

The pooling processing unit 802 extracts feature vectors from respective pooling windows in the corpus samples by hierarchical pooling, determines weights positively correlated with similarities between texts within the respective pooling windows and the respective corpus samples, performs weighting on the extracted feature vectors to obtain feature vectors of the respective pooling windows, and obtains feature vectors of the respective corpus samples composed of the feature vectors of the pooling windows.

The model training unit 803 trains a vector-based intention recognition classifier, based on the feature vectors of the corpus samples.

The intention recognizing unit 804 recognizes an intention in querying a corpus, using the trained intention recognition classifier.

Preferably, the vector learning unit 801 replaces the knowledge base elements in the corpus samples with symbols corresponding to the knowledge base elements, and obtains vectors of the symbols in the corpus samples by word vector training, and converting the corpus samples into row vectors composed of the vectors of the symbols in the corpus samples.

Preferably, each of the pooling windows includes predetermined rows of vectors. The pooling processing unit 802 performs max pooling on the vectors in the pooling windows to obtain first feature vectors, and performs average pooling on the vectors in the pooling windows to obtain second feature vectors.

Figure 9:
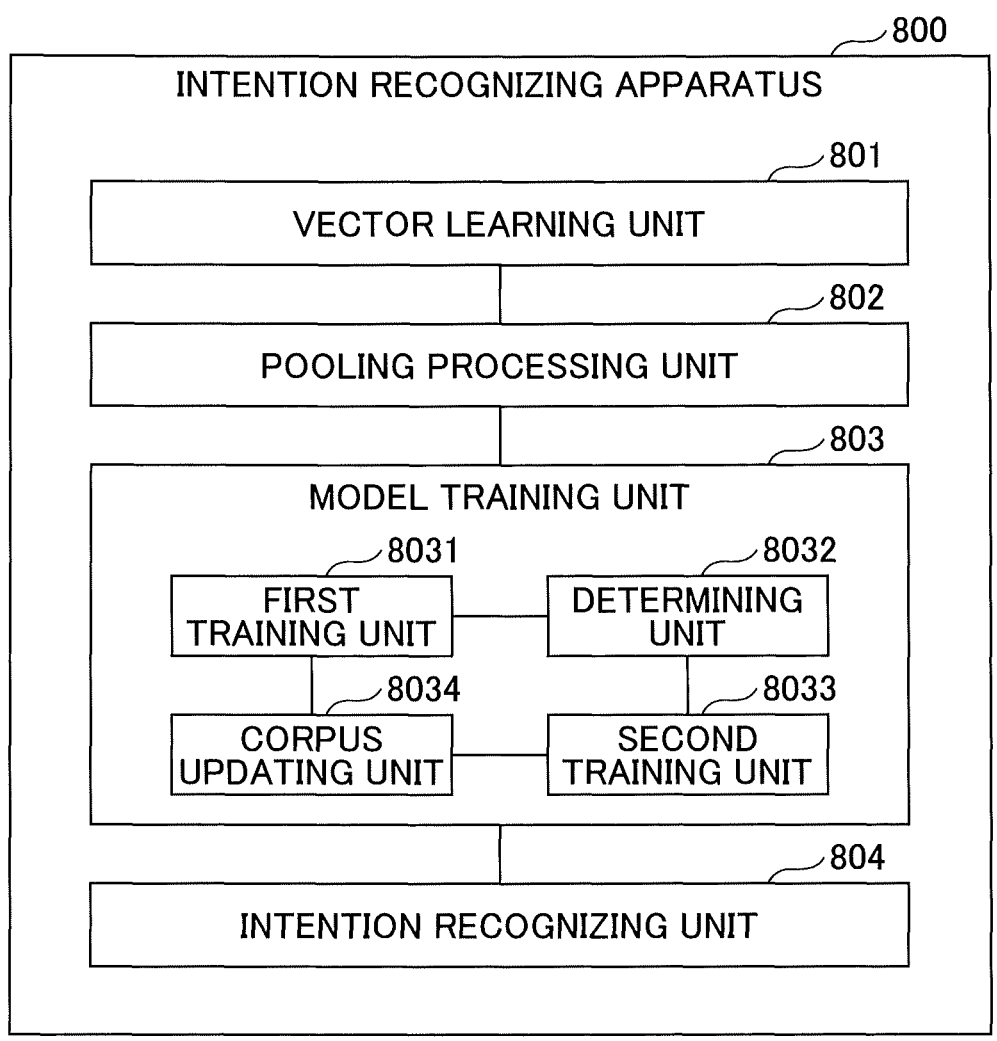
FIG. 9 is a block diagram illustrating another configuration of the intention recognizing apparatus according to the embodiment of the present invention.

Preferably, the corpus samples include tagged corpus samples whose intention is tagged and untagged corpus samples whose intention is not tagged. Preferably, as shown in FIG. 9, the model training unit 803 includes a first training unit 8031, a determining unit 8032, a second training unit 8033 and a corpus updating unit 8034.

The first training unit 8031 trains the intention recognition classifier using the feature vectors of the tagged corpus samples.

The determining unit 8032 determines whether a predetermined training termination condition is satisfied after the training is completed, terminates the training when the training termination condition is satisfied, and triggers the second training unit when the training termination condition is not satisfied.

The second training unit 8033 predicts the intentions of the respective untagged corpus samples using the trained intention recognition classifier, and obtains prediction confidence levels of the respective untagged corpus samples.

The corpus updating unit 8034 selects one or more target corpus samples from the untagged corpus samples based on the prediction confidence levels of the respective untagged corpus samples, and matching degrees between the respective untagged corpus samples and the respective knowledge base elements; tags the target corpus samples based on the predicted intentions and the prediction confidence levels; and deletes the target corpus samples from the untagged corpus samples, adds the target corpus samples to the tagged corpus samples, and triggers the first training unit to continue training the intention recognition classifier.

Preferably, the corpus updating unit 8034 selects one or more first corpus samples whose prediction confidence level is greater than a predetermined threshold from the untagged corpus samples, and selects the target corpus samples from the first corpus samples in a descending order of the numbers of the knowledge base elements included in the respective untagged corpus samples.

According to the intention recognizing apparatus 800 of the embodiment of the present invention, the pooling is performed on the corpus samples based on the similarities between the texts within the respective pooling windows and the respective corpus samples. Thus, compared with the conventional technology, it is possible to accurately extract relevant semantic features, improve the learning and training process of the intention recognition classifier, and improve the performance of the trained intention recognition classifier. Furthermore, in the learning process of the vectors the corpus samples of the embodiment of the present invention, the vector learning is performed based on information such as knowledge base elements. Thus, compared to a method of directly learning original word vectors, it is possible to reduce noise to a certain extent, thereby performing the intention recognition more efficiently and accurately. Additionally, according to the embodiment of the present invention, untagged corpus samples are selected based on the matching degrees between the untagged corpus samples and the information of the knowledge base to expand tagged corpus samples. Thus, it is possible to remove false positive samples in a sample selection process, thereby improving the performance of the intention recognition classifier.

Figure 10:
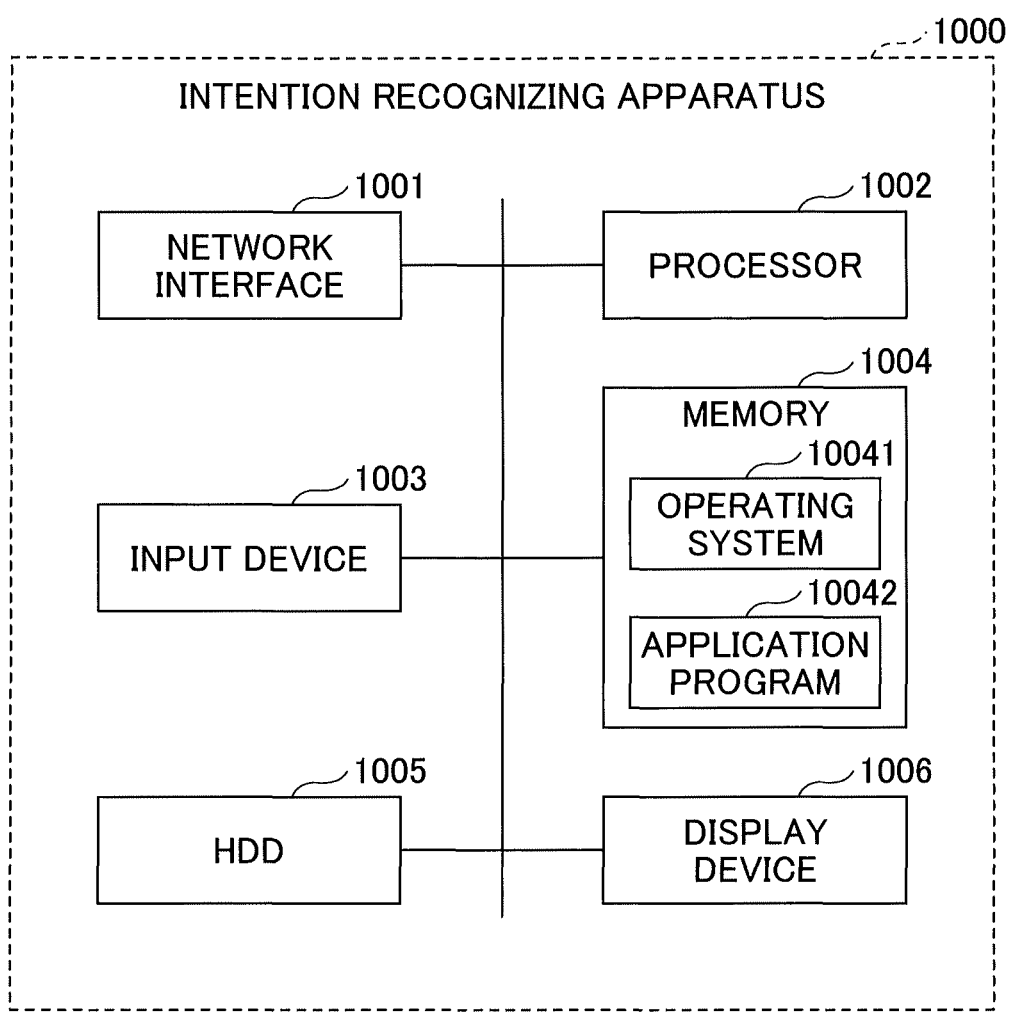
FIG. 10 is a block diagram illustrating a configuration of an intention recognizing apparatus according to another embodiment of the present invention.

An embodiment of the present further provides an intention recognizing apparatus. FIG. 10 is a block diagram illustrating a configuration of an intention recognizing apparatus according to another embodiment of the present invention. As shown in FIG. 10, the intention recognizing apparatus 1000 includes a processor 1002, and a memory 1004 storing computer-executable instructions.

When the computer-executable instructions are executed by the processor 1002, the processor 1002 learns vectors of one or more knowledge base elements in corpus samples, and converts the corpus samples into row vectors composed of the vectors of the knowledge base elements, the knowledge base elements being elements in a predetermined knowledge base; extracts feature vectors from respective pooling windows in the corpus samples by hierarchical pooling, determines weights positively correlated with similarities between texts within the respective pooling windows and the respective corpus samples, performs weighting on the extracted feature vectors to obtain feature vectors of the respective pooling windows, and obtains feature vectors of the respective corpus samples composed of the feature vectors of the pooling windows; trains a vector-based intention recognition classifier, based on the feature vectors of the corpus samples; and recognizes an intention in querying a corpus, using the trained intention recognition classifier.

Furthermore, as illustrated in FIG. 10, the intention recognizing apparatus 1000 further includes a network interface 1001, an input device 1003, a hard disk drive (HDD) 1005, and a display device 1006.

Each of ports and each of devices may be connected to each other via a bus architecture. The processor 1002 such as one or more central processing units (CPUs), and the memory 1004 such as one or more memory units may be connected via various circuits. Other circuits such as an external device, a regulator and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 1001 may be connected to a network (such as the Internet, a LAN or the like), receive information from the network, and store the received information in the hard disk drive 1005. For example, the network interface 1001 may store the collected corpus samples in the hard disk drive 1005.

The input device 1003 may receive various commands such as predetermined threshold and its setting information input by a user, and transmit the commands to the processor 1002 to be executed. The input device 1003 may include a keyboard, a click apparatus (such as a mouse or a track ball), a touch board, a touch panel or the like.

The display device 1006 may display a result obtained by executing the commands, for example, the prediction results of the intentions of the corpus samples and the respective confidence levels.

The memory 1004 stores programs and data required for running an operating system, and data such as intermediate results in calculation processes of the processor 1002.

Note that the memory 1004 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which used as an external high-speed buffer. The memory 1004 of the apparatus or the method described herein includes and is not limited to any other suitable memory.

In some embodiments, the memory 1004 stores executable modules or data structure, their subsets, or their superset, i.e., an operating system (OS) 10041 and an application program 10042.

The operating system 10041 includes various system programs for realizing various essential tasks and processing tasks based on hardware, such as a frame layer, a core library layer, a drive layer and the like. The application program 10042 includes various application programs for realizing various application tasks, such as a browser and the like. A program for realizing the method according to the embodiments of the present invention may be included in the application program 10042.

The method according to the above embodiments of the present invention may be applied to the processor 1002 or may be realized by the processor 1002. The processor 1002 may be an integrated circuit chip capable of processing signals. Each step of the above method may be realized by instructions in a form of integrated logic circuit of hardware in the processor 1002 or a form of software. The processor 1002 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, and alternatively, the processor may be any common processors. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 1004, and the processor 1002 reads information in the memory 1004 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, microcontrollers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Specifically, when the computer-readable instructions are executed by the processor 42, the processor 42 may train word vectors based on a previously selected corpus; calculate semantic vector of the content of the target dialog and semantic vectors of content of one or more sample dialogs in the sample data set based on the word vectors; calculate semantic similarities between the target dialog and the respective sample dialogs based on the semantic vectors; and select the at least one similar dialog in a descending order of the semantic similarities.

Specifically, when the computer-executable instructions are executed by the processor 1002, the processor 1002 may replace the knowledge base elements in the corpus samples with symbols corresponding to the knowledge base elements; and obtain vectors of the symbols in the corpus samples by word vector training, and convert the corpus samples into row vectors composed of the vectors of the symbols in the corpus samples.

Specifically, each of the pooling windows may include predetermined rows of vectors. When the computer-executable instructions are executed by the processor 1002, the processor 1002 may perform max pooling on the vectors in the pooling windows to obtain first feature vectors; and perform average pooling on the vectors in the pooling windows to obtain second feature vectors.

Specifically, the corpus samples may include tagged corpus samples whose intention is tagged and untagged corpus samples whose intention is not tagged. When the computer-executable instructions are executed by the processor 1002, the processor 1002 may train the intention recognition classifier using the feature vectors of the tagged corpus samples, and determine whether a predetermined training termination condition is satisfied after the training is completed; terminate the training when the training termination condition is satisfied; predict the intentions of the respective untagged corpus samples using the trained intention recognition classifier, and obtain prediction confidence levels of the respective untagged corpus samples, when the training termination condition is not satisfied; select one or more target corpus samples from the untagged corpus samples based on the prediction confidence levels of the respective untagged corpus samples, and matching degrees between the respective untagged corpus samples and the respective knowledge base elements, and tag the target corpus samples based on the predicted intentions and the prediction confidence levels; and delete the target corpus samples from the untagged corpus samples, add the target corpus samples to the tagged corpus samples, and train the intention recognition classifier using the feature vectors of the tagged corpus samples again.

Specifically, when the computer-executable instructions are executed by the processor 1002, the processor 1002 may select one or more first corpus samples whose prediction confidence level is greater than a predetermined threshold from the untagged corpus samples; and select the target corpus samples from the first corpus samples in a descending order of the numbers of the knowledge base elements included in the respective untagged corpus samples.

Preferably, the knowledge base elements include entities, attributes and relationships in the knowledge base. The intention recognition classifier is a classifier supporting vector input, and the classifier supporting vector input includes, but is not limited to, a support vector machine (SVM) classifier and a multilayer perceptron (MLP).

As known by a person skilled in the art, the elements and algorithm steps of the embodiments disclosed herein may be implemented by electronic hardware or a combination of computer software and electronic hardware. Whether these functions are performed in hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, may be located in one place, or may be distributed to network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically disclosed embodiments, and various modifications, combinations and replacements may be made without departing from the scope of the present invention.

What is claimed is:

1. A method for recognizing an intention, the method comprising:
    learning vectors of one or more knowledge base elements in corpus samples;
    converting the corpus samples into row vectors composed of the vectors of the knowledge base elements, the knowledge base elements being elements in a predetermined knowledge base;
    extracting feature vectors from respective pooling windows in the corpus samples by hierarchical pooling, wherein
        each of the respective pooling windows includes predetermined rows of vectors, and
        the feature vectors are extracted from the respective pooling windows by
            performing max pooling on the predetermined rows vectors in the pooling windows to obtain first feature vectors, and
            performing average pooling on the predetermined rows vectors in the pooling windows to obtain second feature vectors:
    performing max pooling on the first and second feature vectors extracted from the respective pooling windows;
    determining weights positively correlated with similarities between texts within the respective pooling windows and the respective corpus samples;
    weighting the extracted feature vectors to obtain feature vectors of the respective pooling windows;
    obtaining feature vectors of the respective corpus samples composed of the feature vectors of the pooling windows;
    training a vector-based, intention recognition classifier, based on the feature vectors of the corpus samples; and
    recognizing an intention in querying a corpus, using the trained intention recognition classifier.

2. The method for recognizing an intention as claimed in claim 1,
    wherein learning the vectors of the knowledge base elements in the corpus samples and converting the corpus samples into the row vectors composed of the vectors of the knowledge base elements includes
    replacing the knowledge base elements in the corpus samples with symbols corresponding to the knowledge base elements; and
    obtaining vectors of the symbols in the corpus samples by word vector training, and converting the corpus samples into row vectors composed of the vectors of the symbols in the corpus samples.

3. The method for recognizing an intention as claimed in claim 1,
    wherein the corpus samples include tagged corpus samples whose intention is tagged and untagged corpus samples whose intention is not tagged, and
    wherein training the vector-based, intention recognition classifier based on the feature vectors of the corpus samples includes
    training the intention recognition classifier using the feature vectors of the tagged corpus samples, and determining whether a predetermined training termination condition is satisfied after the training is completed;
    terminating the training when the training termination condition is satisfied;
    predicting the intentions of the respective untagged corpus samples using the trained intention recognition classifier, and obtaining prediction confidence levels of the respective untagged corpus samples, when the training termination condition is not satisfied;
    selecting one or more target corpus samples from the untagged corpus samples based on the prediction confidence levels of the respective untagged corpus samples, and matching degrees between the respective untagged corpus samples and the respective knowledge base elements, and tagging the target corpus samples based on the predicted intentions and the prediction confidence levels; and
    deleting the target corpus samples from the untagged corpus samples, adding the target corpus samples to the tagged corpus samples, and training the intention recognition classifier using the feature vectors of the tagged corpus samples again.

4. The method for recognizing an intention as claimed in claim 3,
    wherein selecting the target corpus samples from the untagged corpus samples based on the prediction confidence levels of the untagged corpus samples, and the matching degrees between the untagged corpus samples and the knowledge base elements includes
    selecting one or more first corpus samples whose prediction confidence level is greater than a predetermined threshold from the untagged corpus samples; and
    selecting the target corpus samples from the first corpus samples in a descending order of the numbers of the knowledge base elements included in the respective untagged corpus samples.

5. The method for recognizing an intention as claimed in claim 1,
    wherein the knowledge base elements include entities, attributes and relationships in the knowledge base.

6. The method for recognizing an intention as claimed in claim 1,
    wherein the intention recognition classifier is a classifier supporting vector input, and
    wherein the classifier supporting vector input includes at least one of a support vector machine (SVM) classifier or a multilayer perceptron (MLP).

7. An apparatus for recognizing an intention, the apparatus comprising:
    a memory storing computer-executable instructions; and
    one or more processors configured to execute the computer-executable instructions such that the one or more processors are configured to
    learn vectors of one or more knowledge base elements in corpus samples;
    convert the corpus samples into row vectors composed of the vectors of the knowledge base elements, the knowledge base elements being elements in a predetermined knowledge base;
extract feature vectors from respective pooling windows in the corpus samples by hierarchical pooling, wherein
each of the respective pooling windows includes predetermined rows of vectors, and
the feature vectors are extracted from the respective pooling windows by
performing max pooling on the predetermined rows vectors in the pooling windows to obtain first feature vectors, and
performing average pooling on the predetermined rows vectors in the pooling windows to obtain second feature vectors;
perform max pooling on the first and second feature vectors extracted from the respective pooling windows;
determine weights positively correlated with similarities between texts within the respective pooling windows and the respective corpus samples;
perform weighting on the extracted feature vectors to obtain feature vectors of the respective pooling windows;
obtain feature vectors of the respective corpus samples composed of the feature vectors of the pooling windows;
train a vector-based intention recognition classifier, based on the feature vectors of the corpus samples; and
recognize an intention in querying a corpus, using the trained intention recognition classifier.

8. The apparatus for recognizing an intention as claimed in claim 7,
wherein the one or more processors are configured to
replace the knowledge base elements in the corpus samples with symbols corresponding to the knowledge base elements; and
obtain vectors of the symbols in the corpus samples by word vector training, and convert the corpus samples into row vectors composed of the vectors of the symbols in the corpus samples.

9. The apparatus for recognizing an intention as claimed in claim 7,
wherein the corpus samples include tagged corpus samples whose intention is tagged and untagged corpus samples whose intention is not tagged, and
wherein the one or more processors are configured to
train the intention recognition classifier using the feature vectors of the tagged corpus samples, and determine whether a predetermined training termination condition is satisfied after the training is completed;
terminate the training when the training termination condition is satisfied;
predict the intentions of the respective untagged corpus samples using the trained intention recognition classifier, and obtain prediction confidence levels of the respective untagged corpus samples, when the training termination condition is not satisfied;
select one or more target corpus samples from the untagged corpus samples based on the prediction confidence levels of the respective untagged corpus samples, and matching degrees between the respective untagged corpus samples and the respective knowledge base elements, and tag the target corpus samples based on the predicted intentions and the prediction confidence levels; and
delete the target corpus samples from the untagged corpus samples, add the target corpus samples to the tagged corpus samples, and train the intention recognition classifier using the feature vectors of the tagged corpus samples again.

10. The apparatus for recognizing an intention as claimed in claim 9,
wherein the one or more processors are configured to
select one or more first corpus samples whose prediction confidence level is greater than a predetermined threshold; and
select the target corpus samples from the first corpus samples in a descending order of the numbers of the knowledge base elements included in the respective untagged corpus samples.

11. The apparatus for recognizing an intention as claimed in claim 7,
wherein the knowledge base elements include entities, attributes and relationships in the knowledge base.

12. The apparatus for recognizing an intention as claimed in claim 7,
wherein the intention, recognition classifier is a classifier supporting vector input, and
wherein the classifier supporting vector input includes at least one of a support vector machine (SVM) classifier or a multilayer perceptron (MLP).

13. A non-transitory computer-readable recording medium having computer-executable instructions for execution by one or more processors, wherein, the computer-executable instructions, when executed, cause the one or more processors to carry out a method for recognizing an intention, the method comprising:
learning vectors of one or more knowledge base elements in corpus samples;
converting the corpus samples into row vectors composed of the vectors of the knowledge base elements, the knowledge base elements being elements in a predetermined knowledge base;
extracting feature vectors from respective pooling windows in the corpus samples by hierarchical pooling, wherein
each of the respective pooling windows includes predetermined rows of vectors, and
the feature vectors are extracted from the respective pooling windows by
performing max pooling on the predetermined rows vectors in the pooling windows to obtain first feature vectors, and
performing average pooling on the predetermined rows vectors in the pooling windows to obtain second feature vectors;
performing max pooling on the first and second feature vectors extracted from the respective pooling windows;
determining weights positively correlated with similarities between texts within the respective pooling windows and the respective corpus samples;
weighting the extracted feature vectors to obtain feature vectors of the respective pooling windows;
obtaining feature vectors of the respective corpus samples composed of the feature vectors of the pooling windows;
training a vector-based intention recognition classifier, based on the feature vectors of the corpus samples; and
recognizing an intention in querying a corpus, using the trained intention recognition classifier.

14. The non-transitory computer-readable recording medium as claimed in claim 13,
- wherein learning the vectors of the knowledge base elements in the corpus samples and converting the corpus samples into the row vectors composed of the vectors of the knowledge base elements includes
- replacing the knowledge base elements in the corpus samples with symbols corresponding to the knowledge base elements; and
- obtaining vectors of the symbols in the corpus samples by word vector training, and converting the corpus samples into row vectors composed of the vectors of the symbols in the corpus samples.

15. The non-transitory computer-readable recording medium as claimed in claim 13,
- wherein the corpus samples include tagged corpus samples whose intention is tagged and untagged corpus samples whose intention is not tagged, and
- wherein training the vector-based intention recognition classifier based on the feature vectors of the corpus samples includes
- training the intention recognition classifier using the feature vectors of the tagged corpus samples, and determining whether a predetermined training termination condition is satisfied after the training is completed;
- terminating the training when the training termination condition is satisfied;
- predicting the intentions of the respective untagged corpus samples using the trained intention recognition classifier, and obtaining prediction confidence levels of the respective untagged corpus samples, when the training termination condition is not satisfied;
- selecting one or more target corpus samples from the untagged corpus samples based on the prediction confidence levels of the respective untagged corpus samples, and matching degrees between the respective untagged corpus samples and the respective knowledge base elements, and tagging the target corpus samples based on the predicted intentions and the prediction confidence levels; and
- deleting the target corpus samples from the untagged corpus samples, adding the target corpus samples to the tagged corpus samples, and training the intention recognition classifier using the feature vectors of the tagged corpus samples again.

16. The non-transitory computer-readable recording medium as claimed in claim 15,
- wherein selecting the target corpus samples from the untagged corpus samples based on the prediction confidence levels of the untagged corpus samples, and the matching degrees between the untagged corpus samples and the knowledge base elements includes
- selecting one or more first corpus samples whose prediction confidence level is greater than a predetermined threshold; and
- selecting the target corpus samples from the first corpus samples in a descending order of the numbers of the knowledge base elements included in the respective untagged corpus samples.

17. The non-transitory computer-readable recording medium as claimed in claim 13,
- wherein the knowledge base elements include entities, attributes and relationships in the knowledge base.

* * * * *